United States Patent [19]

Chen

[11] Patent Number: 5,708,261

[45] Date of Patent: Jan. 13, 1998

[54] BAR CODE DECODING WITH SPEED COMPENSATION

[75] Inventor: Ming C. Chen, Shelton, Conn.

[73] Assignee: Pitney Bowes Inc., Stamford, Conn.

[21] Appl. No.: 537,967

[22] Filed: Oct. 2, 1995

[51] Int. Cl.⁶ ........................................ G06K 7/10
[52] U.S. Cl. ........................................ 235/463; 235/472
[58] Field of Search ........................................ 235/463, 472

[56] References Cited

U.S. PATENT DOCUMENTS

| | | | |
|---|---|---|---|
| 3,893,077 | 7/1975 | Myren | 235/463 |
| 3,906,202 | 9/1975 | Meyer | 235/463 |
| 4,012,716 | 3/1977 | Herrin | 235/463 |
| 4,146,046 | 3/1979 | Dobras | 235/463 |
| 4,414,468 | 11/1983 | Laurer | 235/463 |
| 4,578,570 | 3/1986 | Mazumder et al. | 235/463 |
| 4,757,206 | 7/1988 | Ohta | 235/463 |
| 5,008,520 | 4/1991 | Georgiou et al. | 235/462 |
| 5,036,183 | 7/1991 | Ouchi et al. | 235/463 |
| 5,157,243 | 10/1992 | Ramsey | 235/376 |
| 5,241,164 | 8/1993 | Pavlidis et al. | 235/462 |
| 5,369,260 | 11/1994 | Schuessler | 235/462 |

*Primary Examiner*—Harold Pitts
*Attorney, Agent, or Firm*—Angelo N. Chaclas; Charles R. Malandra, Jr.; Melvin J. Scolnick

[57] ABSTRACT

A method for dynamically establishing a plurality of threshold values for use in decoding a bar code symbol having a plurality of characters where each character includes a plurality of wide and narrow elements. Additionally, the symbol also includes a first character having elements of known sequence and type. The method comprising the step(s) of: (a) keeping an indicator of an amount of time that a light source from a scanner system illuminates a selected element from the first character, (b) establishing a current threshold value based upon the selected element indicator for use in decoding a second element, (c) keeping an indicator for each of the plurality of elements of an amount of time that the light source from the scanner system illuminates the plurality of elements, respectively, and (d) adjusting the current threshold value using the indicators before decoding a subsequent element.

9 Claims, 5 Drawing Sheets

FIG. 1
(PRIOR ART)

| CHAR. | PATTERN | BINARY CODE | CHAR. | PATTERN | BINARY CODE |
|---|---|---|---|---|---|
| 1 | | 100100001 | M | | 101000010 |
| 2 | | 001100001 | N | | 000010011 |
| 3 | | 101100000 | O | | 100010010 |
| 4 | | 000110001 | P | | 001010010 |
| 5 | | 100110000 | Q | | 000000111 |
| 6 | | 001110000 | R | | 100000110 |
| 7 | | 000100101 | S | | 001000110 |
| 8 | | 100100100 | T | | 000010110 |
| 9 | | 001100100 | U | | 110000001 |
| 0 | | 000110100 | V | | 011000001 |
| A | | 100001001 | W | | 111000000 |
| B | | 001001001 | X | | 010010001 |
| C | | 101001000 | Y | | 110010000 |
| D | | 000011001 | Z | | 011010000 |
| E | | 100011000 | - | | 010000101 |
| F | | 001011000 | . | | 110000100 |
| G | | 000001101 | SPACE | | 011000100 |
| H | | 100001100 | * | | 010010100 |
| I | | 001001100 | $ | | 010101000 |
| J | | 000011100 | / | | 010100010 |
| K | | 100000011 | + | | 010001010 |
| L | | 001000011 | % | | 000101010 |

FIG. 6

| ELEMENT NUMBER | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| SCAN SPEED | 15 | 17.7 | 23.3 | 25 | 26.7 | 30.5 | 31.8 | 34.5 | 36.2 | 38.4 | 39.3 | 40.2 | 41.2 | 42.3 | 44.6 | 45.7 | 47.8 | 50 | |
| SCAN COUNT | 333 | 707 | 214 | 199 | 469 | 164 | 394 | 143 | 138 | 130 | 127 | 124 | 121 | 296 | 112 | 274 | 262 | 100 | |
| NO ADJUSTMENT | | | | | | | | | | | | | | | | | | | |
| THRESHOLD | | 500 | 500 | 500 | 500 | 500 | 500 | 500 | 500 | 500 | 500 | 500 | 500 | 500 | 500 | 500 | 500 | 500 | 500 |
| DECODE | 0 | 1 | 0 | 0 | 0* | 0 | 0* | 0 | 0 | 0 | 0 | 0 | 0 | 0* | 0 | 0* | 0* | 0 | |
| FIRST EMBODIMENT | | | | | | | | | | | | | | | | | | | |
| THRESHOLD | | 500 | 500 | 410 | 310 | 310 | 272 | 272 | 230 | 210 | 201 | 192 | 188 | 183 | 183 | 174 | 174 | 174 | 159 |
| DECODE | 0 | 1 | 0 | 0 | 1 | 0 | 1 | 0 | 0 | 0 | 0 | 0 | 0 | 1 | 0 | 1 | 1 | 0 | |
| SECOND EMBODIMENT | | | | | | | | | | | | | | | | | | | |
| THRESHOLD | | 500 | 500 | 410 | 355 | 355 | 300 | 300 | 254 | 230 | 213 | 202 | 194 | 188 | 188 | 178 | 178 | 178 | 164 |
| DECODE | 0 | 1 | 0 | 0 | 1 | 0 | 1 | 0 | 0 | 0 | 0 | 0 | 0 | 1 | 0 | 1 | 1 | 0 | |
| THIRD EMBODIMENT | | | | | | | | | | | | | | | | | | | |
| THRESHOLD | | 500 | 500 | 321 | 298 | 298 | 246 | 246 | 214 | 206 | 194 | 190 | 186 | 182 | 182 | 168 | 168 | 168 | 150 |
| DECODE | 0 | 1 | 0 | 0 | 1 | 0 | 1 | 0 | 0 | 0 | 0 | 0 | 0 | 1 | 0 | 1 | 1 | 0 | |
| FOURTH EMBODIMENT | | | | | | | | | | | | | | | | | | | |
| THRESHOLD | | 500 | 500 | 500 | 500 | 500 | 500 | 500 | 500 | 500 | 500 | 500 | 500 | 500 | 500 | 500 | 500 | 500 | 280 |
| DECODE | 0 | 0 | 0 | 0 | 0* | 0 | 0* | 0 | 0 | 0 | 0 | 0 | 0 | 0* | 0 | 0* | 0* | 0 | |
| FIFTH EMBODIMENT | | | | | | | | | | | | | | | | | | | |
| THRESHOLD | | 500 | 500 | 410 | 310 | 310 | 272 | 272 | 230 | 210 | 201 | 192 | 188 | 183 | 183 | 174 | 174 | 166 | 155 |
| DECODE | 0 | 1 | 0 | 0 | 1 | 0 | 1 | 0 | 0 | 0 | 0 | 0 | 0 | 1 | 0 | 1 | 1 | 0 | |

BAR CODE DECODING WITH SPEED COMPENSATION

FIELD OF THE INVENTION

This invention relates generally to bar code decoding. More particularly, this invention is directed to generating a threshold value for use in decoding bar code elements where the scan speed is variable.

BACKGROUND OF THE INVENTION

The use of bar codes in various industries has proliferated in recent years with the result that bar codes are found almost everywhere. Bar codes provide operational advantages to many industries by automating the retrieval of information. Typically, information contained in bar codes may be retrieved more quickly and with fewer errors than with other techniques, such as human reading of printed words. Because of these operational advantages, bar codes have been adapted for a diverse range of uses.

For example, the retail store industry uses bar codes printed on tags, labels and tickets attached to merchandise for inventory tracking, pricing information and producing detailed customer receipts. Similarly, the grocery store industry uses bar codes printed directly on a product or a product's packaging for the same purposes. These are examples of point-of-sale applications for bar codes. However, many other uses exist for bar codes which are outside of point-of-sale applications. An example is in the automotive industry where bar codes are used internally for production control. Another example is in the health care industry where bar codes are used for patient identification and specimen tracking. Still another example is the United States Department of Defense (DOD) which requires all vendors to designate the contents of every package delivered to any United States military agency in a bar code label affixed to the package.

Another application where bar codes are widely used is the production of mail pieces. Generally, the mail processing equipment used for this purpose includes an inserter system. Inserter systems capable of generating over 10,000 mail pieces per hour are well known in the art and are generally used by organizations, such as banks and insurance companies, which produce a large volume of mailings where the contents of each mail piece varies. Often times, the inputs to the inserter system are computer generated and printed documents where each document contains information that is intended for a particular addressee. It is the function of the inserter system to accept the documents and produce the individual mailings that correspond to each document. To accomplish this, the typical inserter includes a variety of modules for performing different tasks on the documents passing through the inserter, such as: various web handling modules (slitters, cutters and bursters) for separating the continuous forms into singular or discrete documents, a sheet feeder module for feeding individual cut sheets, an accumulator module for assembling the sheets and/or documents into a collation, a folder module for folding the collation into a desired configuration (Z-fold, C-fold, half fold), a conveyor/staging module for transporting and queuing the collation, a plurality of enclosure feeder modules for assembling and adding a packet of enclosures to the collation, an insert station module for inserting the collation into an envelope, and a control system to synchronize the operation of the overall inserter system to assure that the collations are properly assembled. Examples of such inserter systems are the 8 Series™, 9 Series™ and Spectrum™ inserter systems available from Pitney Bowes, Inc., Stamford, Conn.

Typically, information for control of such inserter systems is read from a control document by a bar code scanner associated with the most upstream module in the inserter system. The control document is generally an address bearing document containing a bar code and other information that is specific to a particular addressee. The bar code contains control information for instructing the downstream modules as to how to assemble a particular mail piece. Generally, the control information defines: the number of forms or sheets to be accumulated into a collation, the number of enclosures from each of the enclosure feeder modules to be assembled to the collation and information for other purposes such as the selection of appropriate postage. An example of the use of bar codes in inserter systems is provided in U.S. Pat. No. 5,008,520, entitled METHOD AND APPARATUS FOR READING A BAR CODE ON A MOVING SHEET, issued on Apr. 16, 1991 and assigned to the assignee of the present invention.

Typically, bar codes consist of an alternating sequence of black and white rectangular columns or elements. The elements are aligned parallel to each other and usually are of varying widths. Generally, a series of elements are necessary to define a single character, such as the letter A. It is typical practice in the industry to vary the widths and arrangement of the elements so as to define different characters. Therefore, each character has a unique definition or symbology to distinguish it from other characters.

The reading of bar codes is generally accomplished with a scanner system. Although there are several types of scanners (wand, gun, X-window, fixed beam, etc.), they all operate on the same basic principles. Typically, the scanner includes a light source, optics for directing the light source toward the bar code and a sensor for detecting the amount of light which is reflected back from the bar code. As the bar code and the light source are moved relative to each other, the light source sequentially illuminates each element. Then, because the white elements of the bar code reflect more light than the black elements, the sensor is able to distinguish between them. Additionally, so long as the bar code and the light source are moved relative to each other at a constant speed, a further determination can be made as to the width of each element by keeping track of the time the light source spends on each element. This is typically accomplished by taking scans or samples of the sensor output at a fixed rate and counting the number of scans per element. Thus, the scan count per element is inversely related to the relative speed between the bar code and the light source. Therefore, wider elements will have greater scan counts than narrower elements thus allowing the scanner system to distinguish between wide and narrow elements.

A decoder receives this data from the scanner and deciphers the bar code into corresponding characters. Typically, the decoder first converts the data from the scanner into binary representations. Then, using the binary representations and a predetermined symbology definition, the decoder converts the binary representations into corresponding characters.

Although such scanner and decoder systems generally work well, problems exist when attempting to decipher the bar code when the relative speed between the bar code and the light source is variable. In other words, the speed with which the light source and the bar code move relative to each other is not constant but instead is subject to acceleration and deceleration. If the decoder recognized a given scan count for a narrow element and afterwards the relative speed increases significantly, then the scan count for a subsequent wide element may be the same as, or even smaller than, the scan count for the earlier narrow element. In this circumstance, the decoder will not be able to distinguish between wide and narrow elements resulting in a deciphering error.

Some prior art systems have sought to address this problem by utilizing bar code verifiers to subtract out the effects of variable relative speed. Such systems are available from Symbol Technologies, Inc., of Bohemia, N.Y. An example is disclosed in U.S. Pat. No. 5,369,260, entitled BAR CODE SCANNING WITH CORRECTION FOR SPOT SPEED VARIATION and issued on Nov. 29, 1994. Verifiers work by scanning a calibration bar code having a known sequence of elements of constant width and storing the scan counts for each element of the calibration bar code. Using this series of scan counts, a speed profile which is representative of the change in relative speed exhibited for the calibration bar code is calculated. This speed profile is then used to subtract out or adjust for speed variations in subsequent bar codes.

Although these prior art systems generally work well, they suffer from several drawbacks. One problem is that this technique assumes that the speed variations exhibited for the calibration bar code will be consistent and repeatably predictable for all subsequent bar codes. Thus, this technique is not adaptive and will not compensate for changing operating conditions. For example, if the speed variations were generally repeatable but conditions were to change such that the speed variations were no longer the same as for the calibration bar code, then this technique would be insufficient for accurate deciphering after the conditions changed. Even more of a problem is if the speed variations are not repeatable or totally random from bar code to bar code. In this case, deciphering errors would likely occur right from the beginning. Another problem is that this technique is time consuming and requires a skilled operator using sophisticated equipment to set up.

Other prior art systems have sought to address this problem by utilizing sophisticated velocity encoders to actively measure the relative speed variations. This information is then feed back to the decoder so that adjustments in the decoding procedure can be made. Although these systems generally work well, they are costly to implement and also increase the complexity of the overall system.

Another problem is the wide range of allowable bar codes for a particular bar code specification. For example, the Code 39 type of bar code has by definition only two possible widths for elements, either narrow or wide. However, depending upon the density with which the bar code is printed, the narrow element may range in width from 0.001 inches to 0.040 inches. Furthermore, the width ratio (the width of a wide element divided by the width of a narrow element) may range from two to three. Therefore, a broad spectrum of acceptable bar code formats exist that comply with the Code 39 Specification.

This problem is particularly acute when scanning bar codes in inserter systems. The precise format of the Code 39 bar code on the control document is determined by the users or purchasers of the inserter system. Therefore, the scanner of an inserter system is required to accurately decipher any Code 39 bar code selected by the users provided it is in conformance with the Code 39 Specification. Customizing the scanner for each installation to read a particular format is not only costly and time consuming but does not allow the user the flexibility in the future to change to a different Code 39 format.

Therefore, it is apparent that there is a need for a bar code decoding system with speed, size and density compensation that is simple, inexpensive and automatically adapts to: (1) the wide range of allowable bar codes, (2) different bar code densities, and (3) changing speed variation conditions, so that bar codes are accurately deciphered.

SUMMARY OF THE INVENTION

Generally, the present invention discloses a method for dynamically establishing a plurality of threshold values for use in decoding a bar code symbol having a plurality of characters where each character includes a plurality of wide and narrow elements. Additionally, the symbol also includes a first character having elements of known sequence and type. The method comprising the step(s) of: (a) keeping an indicator of an amount of time that a light source from a scanner system illuminates a selected element from the first character, (b) establishing a current threshold value as the product of a decode factor times the selected element indicator for use in decoding a second element, (c) keeping an indicator for each of the plurality of elements of an amount of time that the light source from the scanner system illuminates the plurality of elements, respectively, and (d) adjusting the current threshold value using the indicators before decoding a subsequent element.

The particular indicators that are used to adjust the current threshold and how those indicators are used to adjust the current threshold are particularly discussed with respect to each of the preferred embodiments.

According to a first embodiment, only the indicators from the last two narrow elements are used to adjust the current threshold value. The current threshold value is adjusted by setting it equal to the average of the indicators for the last two narrow elements times the decode factor.

According to a second embodiment, an indicator from the most recent narrow element and a current "weighted" indicator are used to adjust the current threshold value. The current threshold value is adjusted by setting it equal to the average of the indicator for the most recent narrow element and the current "weighted" indicator times the decode factor. Where the "weighted" indicator is derived from the indicators for the narrow elements.

According to a third embodiment, again only the indicators from the last two narrow elements are used to adjust the current threshold value. The current threshold value is adjusted by multiplying it by the ratio of the indicator for the most recent narrow element over the indicator for the previous narrow element.

According to a fourth embodiment of the present invention, an indicator of an amount of time that the light source from the scanner system illuminates each character is kept. The current threshold T is adjusted by multiplying it by the ratio of the indicator for the most recent character divided by the indicator for the previous character for use in decoding the characters contained in a next character.

According to a fifth embodiment of the present invention, both indicators for the narrow and wide elements are used to adjust the current threshold. This embodiment operates similarly to the first embodiment with respect to the indicators for the narrow elements.

Therefore, it is now apparent that the invention substantially alleviates the problems discussed above. Additional benefits and advantages of the invention will be set forth in the description which follows, and in part will be obvious from the description, or may be learned by practice of the invention. The benefits and advantages of the invention may

5 be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together above and the detailed description above and the detailed description of the preferred embodiment given below, serve to explain the principles of the invention. As shown throughout the drawings, like reference numerals designate like or corresponding parts.

FIG. 1 is a chart of the Code 39 bar code symbology.

FIG. 6 is a table containing an example of the embodiments of the present invention utilizing the scanner system of FIG. 3 to decode a bar code symbol.

DETAILED DESCRIPTION OF THE PREFERRED EMBODIMENTS

Referring to FIG. 1, the Code 39 symbology is shown. The Code 39 type of bar code is an example of a variable width binary bar code. The characters 0–9, A–Z, –, *, SPACE, *, $, /, + and % are shown along with their corresponding bar code and binary code patterns. It should be noted that each character is defined by five black elements and four intervening white elements for a total of nine elements per character. Additionally, there are only two sizes of elements, either narrow or wide. Another requirement of the Code 39 symbology is that of the nine elements that define each character, three elements must be wide while the remaining six elements must be narrow. Accordingly, narrow elements, both black and white, are decoded as "0" and wide elements, both black and white, are decoded as "1". Thus, the particular arrangement or pattern of narrow and wide elements determines the character being coded.

According to the Code 39 Specification, every bar code symbol requires a leading quiet zone, a start character, a sequence of one or more data characters, a stop character and a trailing quiet zone. An optional check character may also be included. Furthermore, it is required that the stop and start characters must always be an asterisk (*) and each character must be separated by a character gap. Code 39 bar code symbols may also be printed at different densities (number of characters per inch) by varying the width of the elements. However, the width of wide elements must always be two to three times that of the narrow elements. A more detailed description of the Code 39 Specification is available in *Reading Between the Lines: An Introduction to Bar Code Technology*, authored by Craig K. Harmon and Russ Adams, and published by Helmers Publishing, Inc., which is specifically incorporated herein by reference.

Figure 2:
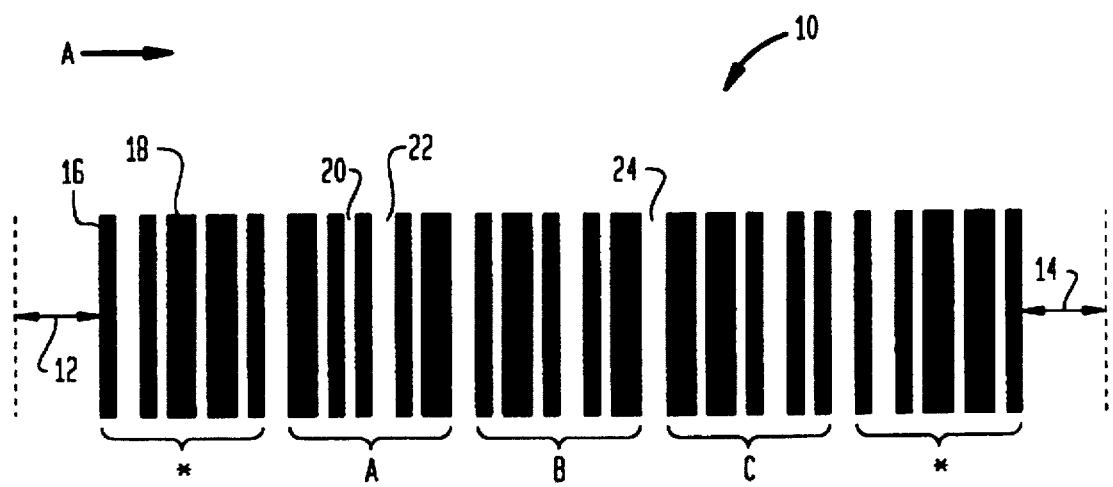
FIG. 2 is a representative Code 39 bar code symbol.

Referring to FIG. 2, a representative bar code symbol 10 having all the required components is shown. If the bar code symbol 10 is scanned in the direction indicated by arrow "A", then the bar code symbol 10 includes a leading quiet zone 12, a start character "*", a sequence of data characters "ABC", a stop character "*" and a trailing quiet zone 14. Also shown are a representative: narrow black element 16, wide black element 18, narrow white element 20, wide white element 22 and character gap 24.

Figure 3:
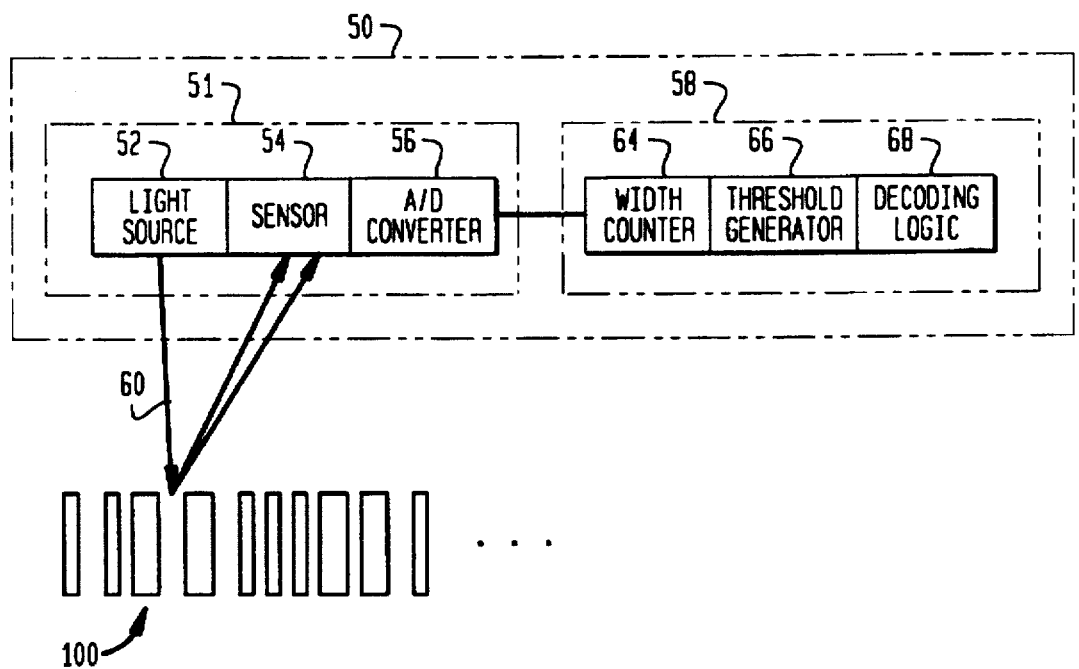
FIG. 3 is a diagrammatic view of a scanner system in accordance with the present invention.

Referring to FIG. 3, a diagrammatic view of a scanner system 50 scanning a typical symbol 100, in Code 39 format, in accordance with the present invention is shown. The scanner system 50 includes a scan head 51 and a decoder 58. The scan head 51 includes a light source 52 for producing a beam of light 60 where the beam 60 is directed toward the symbol 100, a sensor 54 for detecting the amount of light which is reflected back from the symbol 100, and an A/D converter 56 for converting the analog signal produced by the sensor 54 to a digital signal. The decoder 58 scans or samples the digitized image data provided by the scan head 51 as the beam 60 moves relative to the symbol 100 encountering each element of symbol 100. The decoder 58 includes a counter 64 for keeping a count of the number of scans for each element in symbol 100, a threshold generator 66 and decoding logic 68. Since the scans occur at a predetermined rate, the scan count provides an indication of the amount of time that the light source 52 illuminates each element. Using these scan counts, the decoder 58 deciphers the elements of symbol 100 into their corresponding binary representations and then further deciphers the binary representations into corresponding characters.

Figure 4:
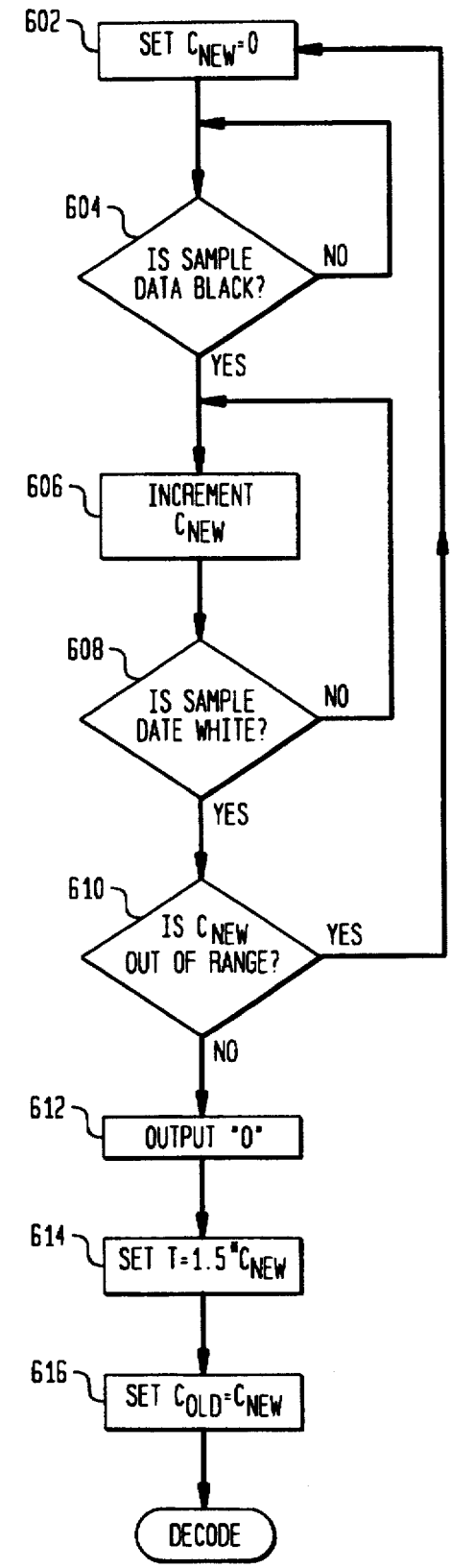
FIG. 4 is a flow chart of procedure START 600 in accordance with the present invention.
Figure 5A:
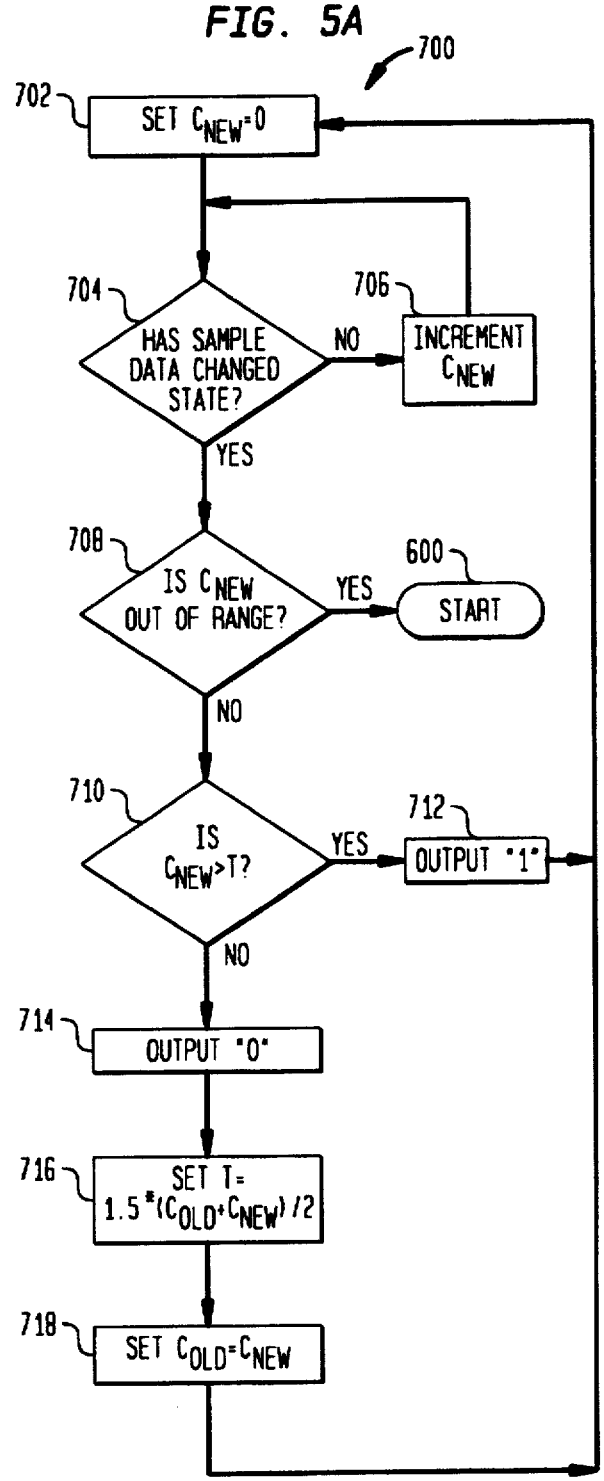
FIG. 5A is a flow chart of procedure DECODE 700 in accordance with the present invention.

Referring to FIGS. 4 and 5A, the scanner system 50 implements procedures START 600 and DECODE 700 according to a first embodiment of the present invention. The procedure START 600 waits for the first element of a symbol and establishes an initial threshold with which to evaluate subsequent elements. Then, the procedure DECODE 700 evaluates and decodes subsequent elements while making adjustments to the initial threshold value.

The procedure START 600 begins decoding a bar code symbol, at 602, by setting variable $C_{new}$ which is used for keeping a count of the number of scans per element equal to zero. At 604, a determination is made whether a sample or scan of the data from the sensor 54 indicates a black element. If not, then the procedure START 600 loops back on itself and continues to check for a black element. If the scan data does indicate a black element, then at 606 the variable $C_{new}$ is incremented by one. Thus, it should be apparent that the procedure START 600 will not advance past 604 until the first element of a symbol, which is always black, is detected. At 608, a determination is made whether the scan data from the sensor 54 indicates a white element. If not, then the procedure loops back to 606 where $C_{new}$ is again incremented by one. However, if the scan data does indicate a white element, then the procedure advances to 610. Thus, it should be apparent that $C_{new}$ keeps the scan count for the first element. At 610, a determination is made whether $C_{new}$ is outside of a predetermined range of acceptable values. The predetermined range is established so as to screen for erroneous readings or conditions that are not favorable to accurate reading and decoding of symbols. If $C_{new}$ is outside of the predetermined range, then the procedure loops back to 602 without decoding the current symbol to wait for the beginning of the next symbol. Optionally, an error message or other indicator may be produced to indicate that the present symbol has not been decoded. On the other hand, if $C_{new}$ is not outside of the predetermined range, then at 612 the first element is decoded without any evaluation by outputting a "0". This takes advantage of the fact that the first character of a Code 39 symbol must always be the start character "*" and its first element by definition is narrow.

Next, at 614 a threshold T is set equal to 1.5 times $C_{new}$. The threshold T will be utilized to decode the subsequent elements. Next, at 616 a variable $C_{old}$ is set equal to $C_{new}$. The variable $C_{old}$ will be utilized to make subsequent adjustments to T as reading of the symbol progresses. Next, at 618 the procedure START 600 advances to procedure DECODE 700 to decode subsequent elements.

The procedure DECODE 700 begins at 702 by setting $C_{new}$ to zero. At 704, a determination is made whether the scan data has changed state from indicating a black element to a white element, or vice versa. If no change has occurred, then at 706 $C_{new}$ is incremented by one and the procedure loops back to 704. However, if a change has occurred, then the procedure advances to 708. Thus, it should be apparent that $C_{new}$ keeps the scan count for the elements. At 708, a determination is made whether $C_{new}$ is outside of a predetermined range of acceptable values. This determination is analogous to the function performed at 610 in procedure START 600. However, 708 will also serve to recognize the end of the symbol and return control to procedure START 600. If $C_{new}$ is outside of the predetermined range, then the procedure returns control to procedure START 600. Optionally, an error message or end of symbol indication may be produced as the case may be. On the other hand, if $C_{new}$ is not outside of the predetermined range, then at 710 a determination is made whether $C_{new}$ is greater than threshold T. If $C_{new}$ is greater than T, then at 712 the element is decoded as a wide element by outputting a "1" before looping back to 702 to process the next element. However, if $C_{new}$ is not greater than T, then at 714 the element is decoded as a narrow element by outputting a "0". Thus, it should be apparent that at 614 T was set to the scan count of the first element, which was narrow, times a decode factor, which was 1.5, so as to be able to distinguish between subsequent narrow and wide elements. Because wide elements are two to three times wider than narrow elements, 1.5 serves as an appropriate decode factor. Next, at 716 T is adjusted to compensate for any changes in relative speed between the scanner and the symbol. Here, T is set equal to 1.5 times the average of the scan counts for the two most recent narrow elements. It should be understood that $C_{old}$ represents the scan count of the last narrow element while $C_{new}$ represents the scan count of the current narrow element. Accordingly, $C_{old}$ and $C_{new}$ are added together, divided by two and then multiplied by 1.5 to establish a new threshold T for use in decoding the next element. Thus, by recalculating a new threshold T, any changes in relative speed between the light beam and the symbol will be accounted for. Then, at 718, $C_{old}$ is set equal to $C_{new}$ before the procedure loops back to 702 to decode the next element. The procedure DECODE 700 continues in this fashion until the entire symbol has been decoded.

Thus, it should be apparent that the threshold T is dynamically adjusted to compensate for relative speed variations. Additionally, the initial threshold T established from the first element of the start character "∗" compensates for the density at which the symbol is printed. It is important to note that in this first embodiment only the narrow elements are used to adjust threshold T. Since the ratio of wide elements to narrow elements is not known, it is impossible to exactly average the scan count of a wide element with a narrow element. For example, if it was known that the wide elements are three times wider than the narrow elements, then the scan counts for a wide element and a narrow element could be averaged. One way would be to add the wide element scan count with the narrow element scan count and then divided the sum by four. Another way would be to divide the wide element scan count by three and then add this result to the narrow element scan count before dividing by two. However, it is also possible that the wide elements may only be two times wider than the narrow elements. In this instance, the scan counts for a wide element and a narrow element could not be averaged together using the techniques for a width ratio of three. The techniques would have to be modified to account for the different width ratio. Thus, unless the exact ratio is known, the scan count of a narrow element cannot be averaged with that of a wide element. Fortunately, since only three of the nine elements are wide, there are plenty of narrow elements to use to adjust threshold T. In most instances, only utilizing the narrow elements does not create any decoding difficulties because of: (1) the practical limitations of accelerating and decelerating the scanning of the bar code symbol, (2) the small linear distances from element to element, and (3) the tolerance built into the decode factor.

According to a second embodiment of the present invention, the algorithm of procedure DECODE 700 is changed to so as to develop a "weighted" average of the scan counts of the last two narrow elements. In this embodiment, at 718, $C_{old}$ would be set equal to the sum of $C_{old}$ and $C_{new}$ divided by two. Thus, the second embodiment will not respond quite as quickly as the first embodiment to changes in speed. However, the second embodiment will be less sensitive to individual scan counts. Therefore, if a scan count has been improperly influenced by poor print quality or some other reason, then the second embodiment will not be overly influenced by this false scan count.

According to a third embodiment of the present invention, the algorithm of procedure DECODE 700 is modified to so as to develop a percentage change in the scan counts of the last two narrow elements. Then, this same percentage change is applied to the threshold to develop a new threshold. In this embodiment, at 716, T would be set equal to T times the ratio of $C_{new}$ divided by $C_{old}$. Thus, if $C_{new}$ was ten percent smaller than $C_{old}$, then T would also be adjusted by ten percent.

According to a fourth embodiment of the present invention, the algorithm of procedure DECODE 700 is changed so that the scan count for each character is compared with the scan count for the previous character to develop an adjustment for the threshold T. Since each character has exactly six narrow elements and three wide elements, each character in any given symbol is of exactly the same length, regardless of the density or width ratio used. Therefore, the initial threshold T would be adjusted by multiplying it by the ratio of the total scan count for a just completed character divided by the total scan count for the previously completed character. Thus, the threshold T would be constant for each element within a character and then adjust accordingly for the first element of each subsequent character. It will be apparent to those skilled in the art that this embodiment is significantly slower to respond to changes in speed than any of the first, second or third embodiments. However, the fourth embodiment is the most tolerant of false scan counts for individual elements. In applications where the changes in speed are slow and deliberate, this embodiment would likely serve adequately.

According to a fifth embodiment of the present invention, the wide elements are also used to adjust threshold T even though the ratio of the widths is not known. The fifth embodiment is designed to operate in applications where the changes in speed are great. More particularly, it is designed to accommodate a worst case scenario of data characters "QW" appearing in a high acceleration or deceleration application to prevent a decoding error. Referring to FIG. 1, it is apparent that character "Q" ends with three consecutive wide elements while character "W" begins with three consecutive wide elements. Thus, if character "W" follows character "Q", then a situation where a total of six consecutive wide elements without any intervening narrow elements is created. As discussed above, the first embodiment when presented with this situation will not adjust threshold T over the course of these six wide elements. In applications that do not experience high accelerations or decelerations this situation will likely not produce any decoding errors. However, in high acceleration or deceleration applications the change in speed between the first wide element and the last wide element in the sequence of six wide elements would likely be so great as to cause a decoding error if threshold T were not adjusted. The fifth embodiment addresses this potential problem.

Figure 5B:
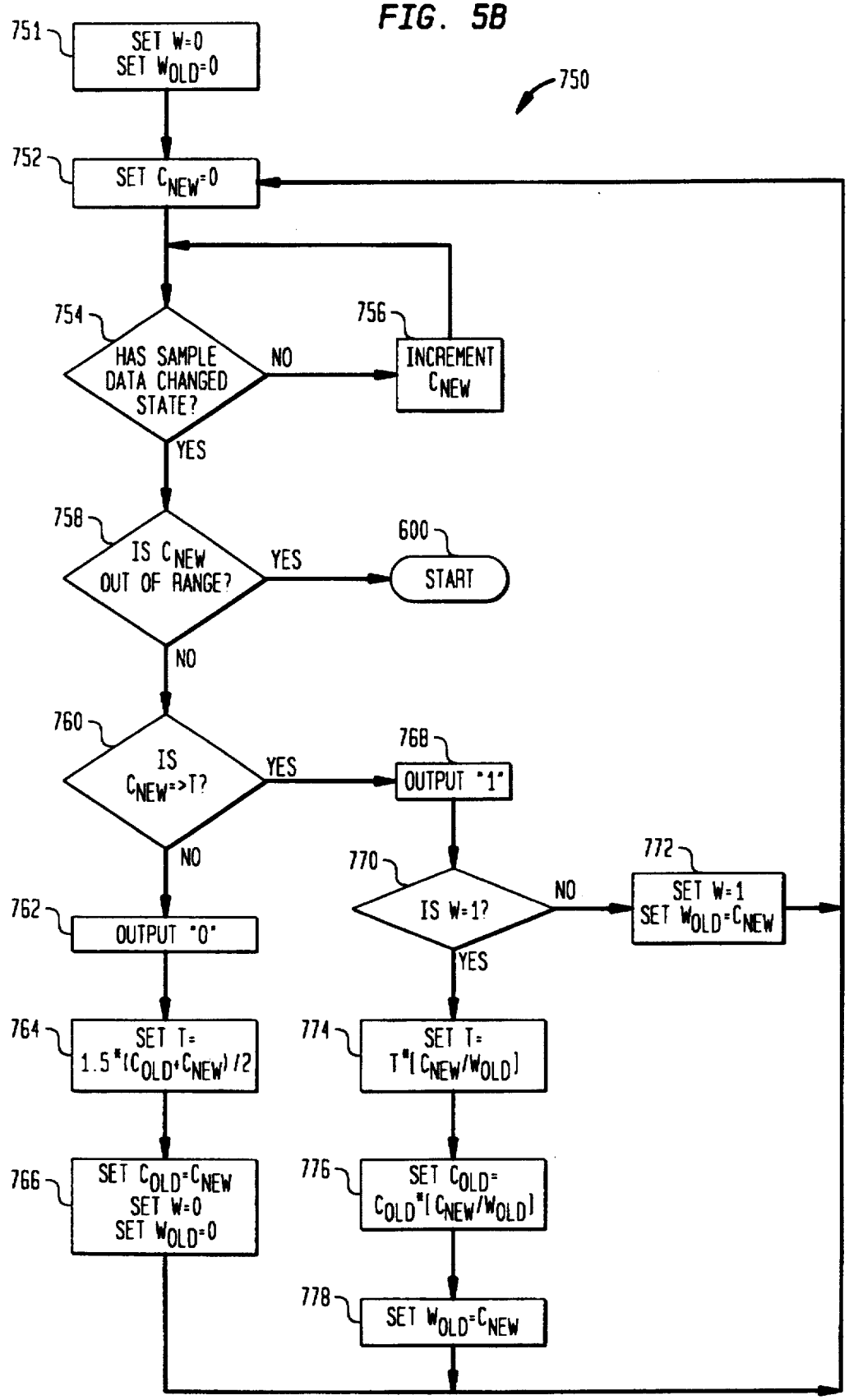
FIG. 5B is a flow chart of procedure DECODE 750 in accordance with the present invention.

Referring to FIG. 5B, procedure DECODE 750 of the fifth embodiment is shown which is adapted from procedure DECODE 700 of the first embodiment. In the fifth embodiment, threshold T is adjusted for each narrow element similarly to the first embodiment. However, threshold T is also adjusted when wide elements are found adjacent to each other. The procedure DECODE 750 begins at 751 by setting W and $W_{old}$ zero. The variable W keeps track of whether the last element decoded was wide or narrow while $W_{old}$ keeps a count of the number of scans for the last wide element. At 752, $C_{new}$ is set equal to zero. At 754, a determination is made whether the scan data has changed state from indicating a black element to a white element, or vice versa. If no change has occurred, then at 756 $C_{new}$ is incremented by one and the procedure loops back to 754. If change has occurred, then the procedure advances to 758. At 758, a determination is made whether $C_{new}$ is outside of a predetermined range of acceptable values. If $C_{new}$ is outside of the predetermined range, then the procedure returns control to procedure START 600. On the other hand, if $C_{new}$ is not outside of the predetermined range, then at 760 a determination is made whether $C_{new}$ is greater than threshold T. If $C_{new}$ is not greater than T, then at 762 the element is decoded as a narrow element by outputting a "0". Next, at 764 T is adjusted to compensate for and changes in relative speed between the scanner and the symbol. Here, T is set equal to 1.5 times the average of the $C_{old}$ and $C_{new}$. Then, at 766, $C_{old}$ is set equal to $C_{new}$, W is set equal to zero, and $W_{old}$ is set equal to zero before the procedure loops back to 752 to decode the next element.

However, if at 760 $C_{new}$ is greater than T, then at 768 the element is decoded as a wide element by outputting a "1". Next, at 770, a determination is made whether W is equal to one. If W is not equal to one, then at 772 W is set equal to one and $W_{old}$ is set equal to $C_{new}$ before the procedure loops back to 752. In this manner, no adjustment will be made to threshold T when a first wide element is encountered. However, if at 770 W is equal to one, then at 774 threshold T is set equal to T times $C_{new}$ divided by $W_{old}$. In this manner, adjacent wide elements are required before an adjustment is made to threshold T. Block 766 ensures this by setting W and $W_{old}$ equal to zero each time a narrow element is encountered. Thus, threshold T is adjusted by the percent change in scan counts for adjacent wide elements. Since the percent change in scan counts is used, the width ratio need not be known. Therefore, this embodiment is independent of the width ratio. Next, at 776, $C_{old}$, which represents the scan count for the last narrow element, is adjusted in the same manner as threshold T by setting $C_{old}$ equal to $C_{old}$ times $C_{new}$ divided by $W_{old}$. Thus, when a scan count for the next narrow element is obtained, it can be averaged with a adjusted value for the last narrow element scan count. Then, at 778, $W_{old}$ is set equal to $C_{new}$ before the procedure loops back to 752.

It should now be apparent that numerous different algorithms may be derived which adjust the threshold value as the bar code symbol is scanned. The exact algorithm selected is a matter of design choice depending upon the needs of a particular application and the ease of implementation. Therefore, the embodiments described above are merely illustrative in nature and not intended to provide an exhaustive description of all possible algorithms.

It should also now be apparent that the embodiments described above are adapted to those applications where the width ratio is unknown or subject to change without prior notification. However, if the width ratio is known and constant from symbol to symbol, than those skilled in the art will be able to adapt the above embodiments to better suit those applications with only minor mathematical manipulation.

Referring to FIG. 6, a table 200 containing an example of the embodiments of the present invention utilizing the scanner system 50 of FIG. 3 to decode symbol 100 is shown. Referring to FIGS. 3 and 6, this example assumes the following operating conditions: a scan rate for the scanner system 50 of 0.000002 seconds per scan, a width for the narrow elements of 0.010 inches, a width for the wide elements of 0.025 inches, an initial relative speed or scan speed of 15.0 inches per second and an acceleration of 4000.0 inches per second per second. For ease of illustration, only the start character "*", a first data character "T" and appropriate intercharacter gaps are shown in symbol 100. Shown directly above each element of symbol 100 is the element's number in order of scanning. Table 200 includes the approximate scan speed and the scan count for each element. Also shown in table 200, for each element, are the threshold values ascertained by the different embodiments discussed above which are then used to obtain the corresponding decoded output values. Additionally, for comparison purposes, a case where the threshold value is not dynamically adjusted is shown.

The no adjustment case, first, second, third, fourth and fifth embodiments all behave similarly with respect to decoding the first two elements of the symbol 100. A threshold value is not used to decode the first element of the start character "*" since it is known that this element must be narrow or "0". However, the scan count for this first element is used to establish a threshold value for use in decoding the second element. Since the scan count for the first element is three hundred thirty-three, the threshold value for the second element is set equal to five hundred (1.5 times the scan count for the first element). Because the scan count for the second element is seven hundred seven, which is greater than the threshold value, the second element is decoded as wide or "1". From this point, the no adjustment case, first, second, third, fourth and fifth embodiments follow their respective algorithms or schemes for decoding the remaining elements. The results obtained from each case are provided in the table. Any decode errors are indicated by an asterisk next to the decode output value.

Many features of the preferred embodiments represent design choices selected to best exploit the inventive concept as implemented in an application where the width ratio is unknown or subject to change and the relative speed is not constant. An example of this type of application is in an inserter system where the symbols are printed close to the leading edge of a sheet and the scanner system is operatively coupled with an upstream sheet feeding apparatus. An example of an inserter system in which the present invention may be employed is disclosed in U.S. Pat. No. 5,008,520, entitled METHOD AND APPARATUS FOR READING A BAR CODE ON A MOVING SHEET, issued on Apr. 16, 1991, assigned to the assignee of the present invention and specifically incorporated herein by reference. The present invention improves such inserter systems by allowing scanning of the symbols before the sheet has reached constant speed. This has the practical advantage of allowing the bar code symbol to be printed close to the lead edge of a sheet and having the bar code scanner begin reading the symbol almost immediately. Those skilled in the art will certainly find other applications for the present invention.

It is important to note that the present invention is independent of whether: (1) the symbol moves past a fixed beam, (2) the symbol is stationary while scanned by a moving beam, or (3) the symbol moves and is scanned by a moving beam. The present invention is particularly suited to adapt to any changes in relative speed between the symbol and the beam or light source.

It is also important to note that the components of scanner system 50 do not necessarily need to be located within the same housing or device. The present invention does not depend on the type, selection or arrangement of the components of scanner system 50.

It will be apparent to those skilled in the art that since the first nine elements of the start character are known, there is no particular need to even use a threshold value to decode any of the first nine element in a Code 39 symbol. Therefore, it is possible to wait until the ninth element of the start character, which like the first element is narrow, to establish a threshold value for the first element of the next character. Likewise, any intervening narrow element in the start character could be used.

It will also be apparent to those skilled in the art that the symbol may be "read" into a buffer and then subsequently decoded. Thus, the know character need not be the first character read, but typically would be the first element processed.

Furthermore, the present invention is not restricted to use with only Code 39 symbols. On the contrary, the present invention may be employed in any application where an element of a symbol is of known characteristics. Such would be the case in applications where start characters are used, regardless of the type of bar code definition selected.

Still other modifications will likely occur to those skilled in the art. Therefore, the invention in its broader aspects is not limited to the specific details of the preferred embodiments. Accordingly, various modifications may be made without departing from the spirit of the general inventive concept as defined by the appended claims and their equivalents.

What is claimed is:

1. A method for dynamically establishing threshold values for use in decoding a Code 39 bar code symbol having a plurality of characters with each character including a plurality of elements of narrow type and a plurality of elements of wide type, the plurality of characters including a first character, the method comprising the step(s) of:

(a) keeping a first indicator of an amount of time that a light source from a scanner system illuminates a first element of the first character and decoding the first element as narrow type;

(b) establishing a threshold value based upon the first indicator for use in decoding the plurality of elements of each character;

(c) keeping an indicator of an amount of time that a light source from a scanner system illuminates each element of each character; and (d) adjusting the threshold value based upon a change in magnitude between the indicators for a most recent two elements which have been decoded as narrow type.

2. The method of claim 1 further comprising the step(s) of:

(e) keeping the threshold value constant if an immediately preceding element is decoded as narrow type and a current element is decoded as wide type.

3. The method of claim 2 further comprising the step(s) of:

(f) adjusting the threshold value using an average of the indicators for the most recent two elements which have been decoded as narrow type.

4. The method of claim 2 further comprising the step(s) of:

(f) adjusting the threshold value using a ratio of the indicators for the most recent two elements which have been decoded as narrow type.

5. The method of claim 2 further comprising the step(s) of:

(f) adjusting the threshold value using, a weighted average calculated from the indicators for the elements which have been decoded as narrow type.

6. The method of claim 2 further comprising the step(s) of:

(f) adjusting the threshold value based upon a change in magnitude between the indicators for a consecutive two elements which have been decoded as wide type.

7. The method of claim 6 further comprising the step(s) of:

(g) adjusting the threshold value using an average of the indicators for the most recent two elements which have been decoded as narrow type.

8. The method of claim 6 further comprising the step(s) of:

(g) adjusting the threshold value using a ratio of the indicators for the most recent two elements which have been decoded as narrow type.

9. The method of claim 6 further comprising the step(s) of:

(g) adjusting the threshold value using a weighted average calculated from the indicators for the elements which have been decoded as narrow type.

* * * * *